Figure 1:
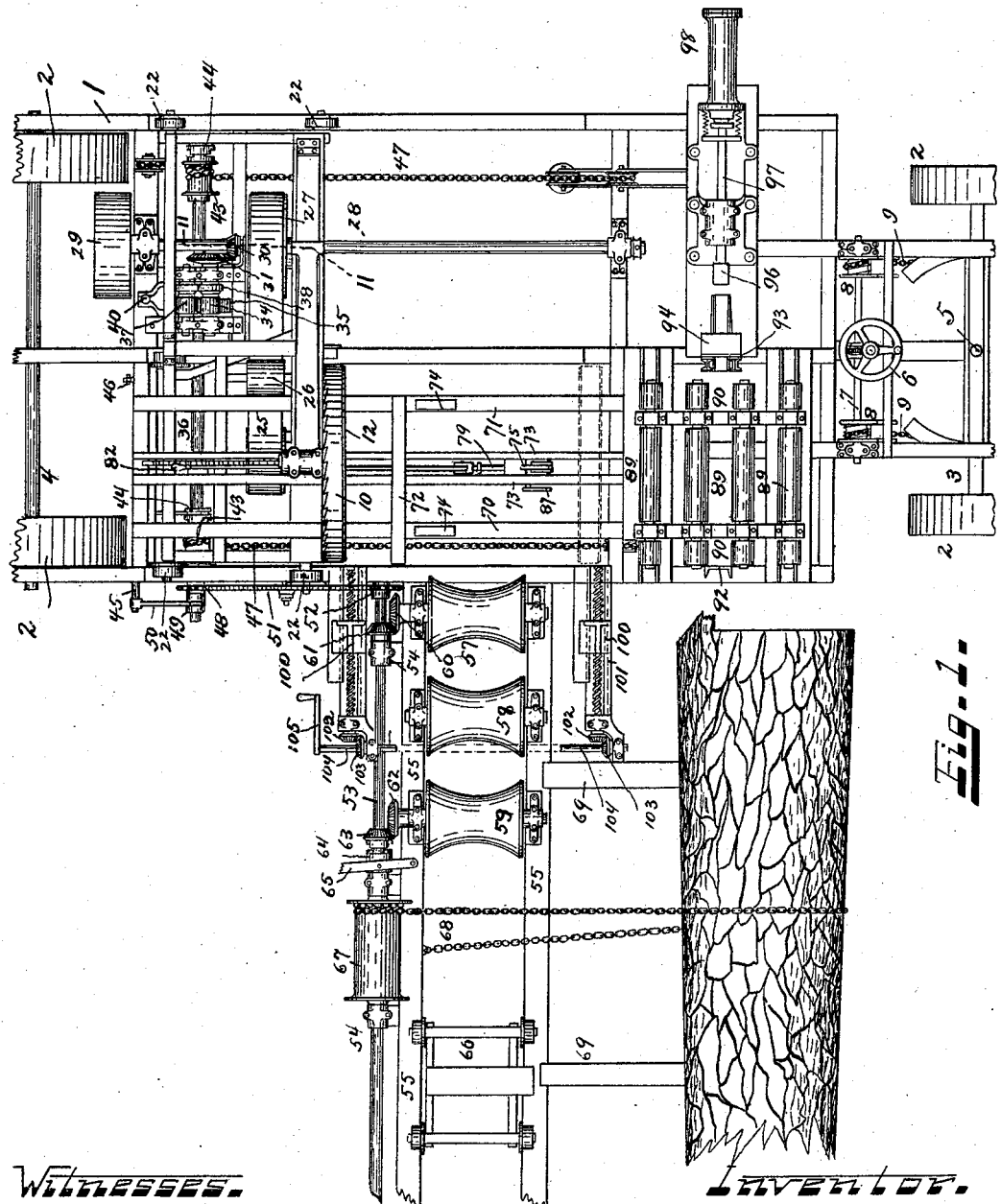

A. P. HOWARD.
WOOD SAWING AND SPLITTING MACHINE.
APPLICATION FILED FEB. 17, 1908.

1,001,272.

Patented Aug. 22, 1911.
5 SHEETS—SHEET 1.

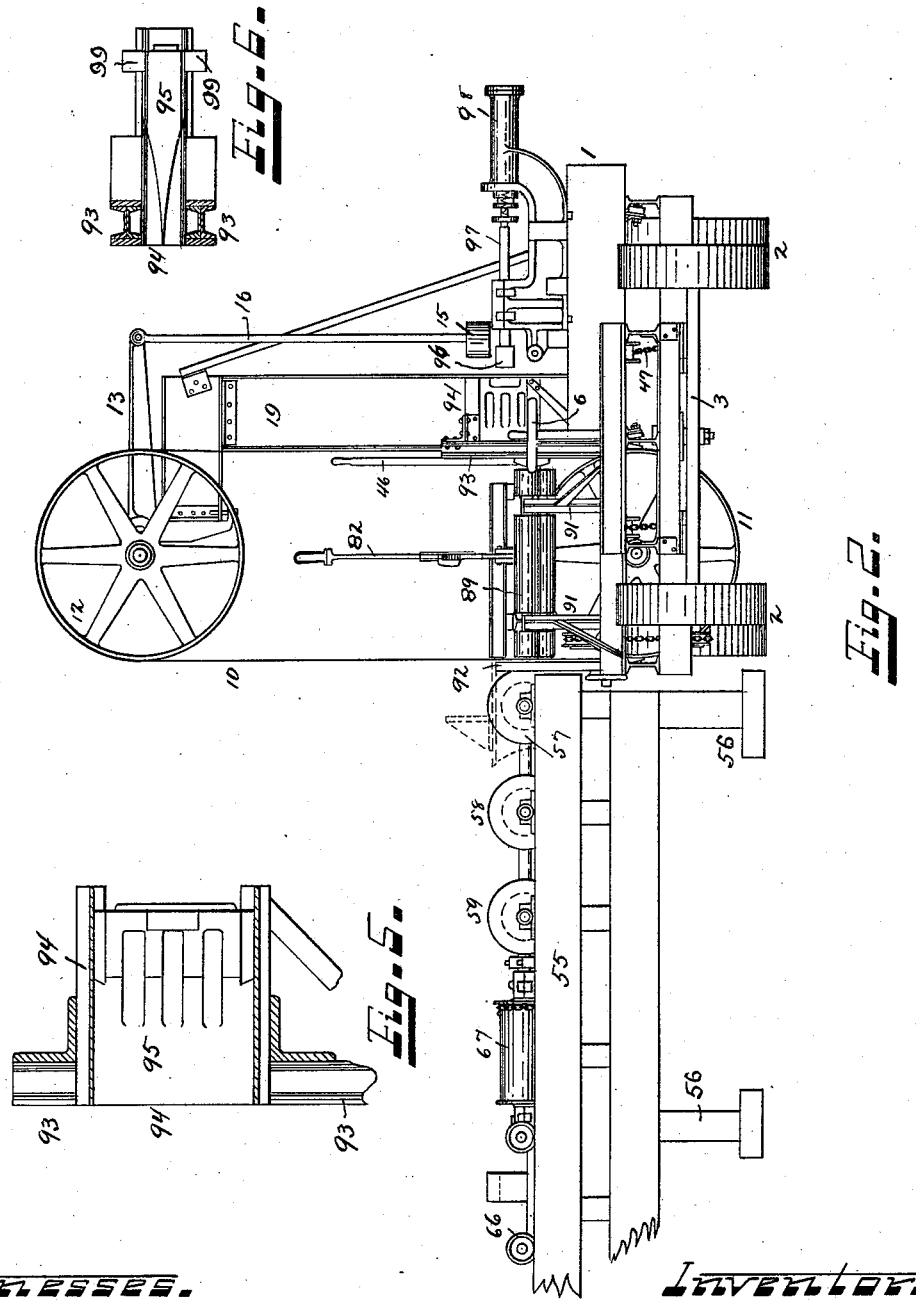

A. P. HOWARD.
WOOD SAWING AND SPLITTING MACHINE.
APPLICATION FILED FEB. 17, 1908.
1,001,272.
Patented Aug. 22, 1911.
5 SHEETS—SHEET 3.
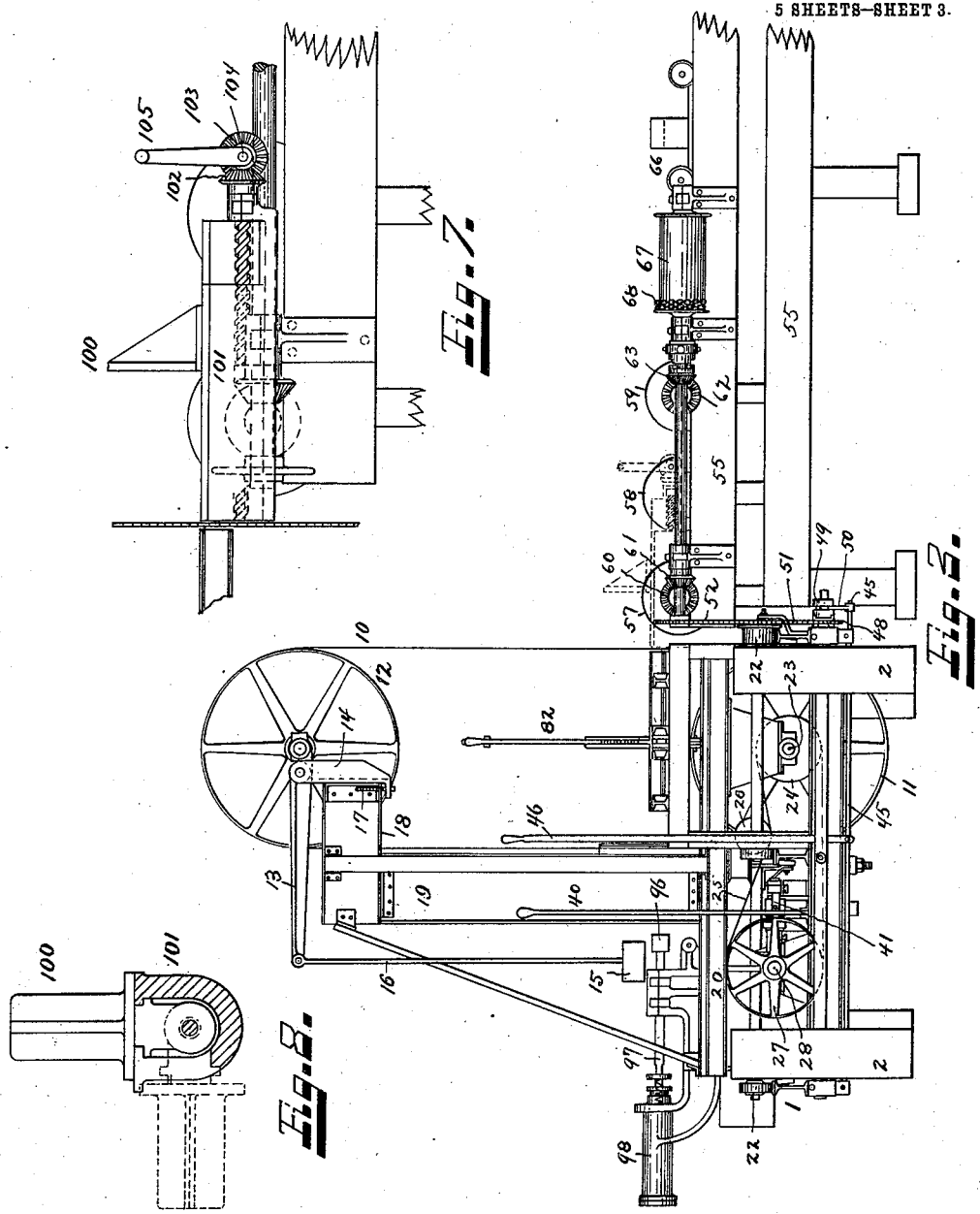

A. P. HOWARD.
WOOD SAWING AND SPLITTING MACHINE.
APPLICATION FILED FEB. 17, 1908.
1,001,272.
Patented Aug. 22, 1911.
5 SHEETS—SHEET 4.
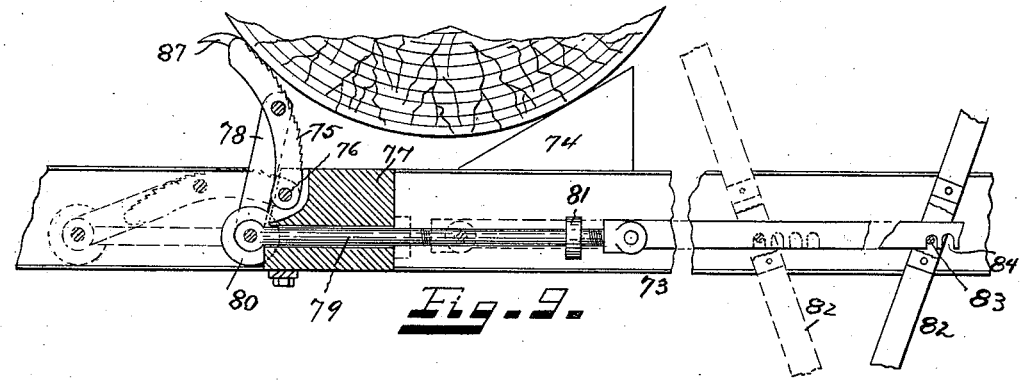
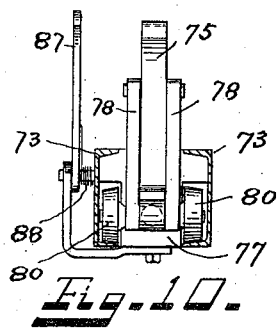
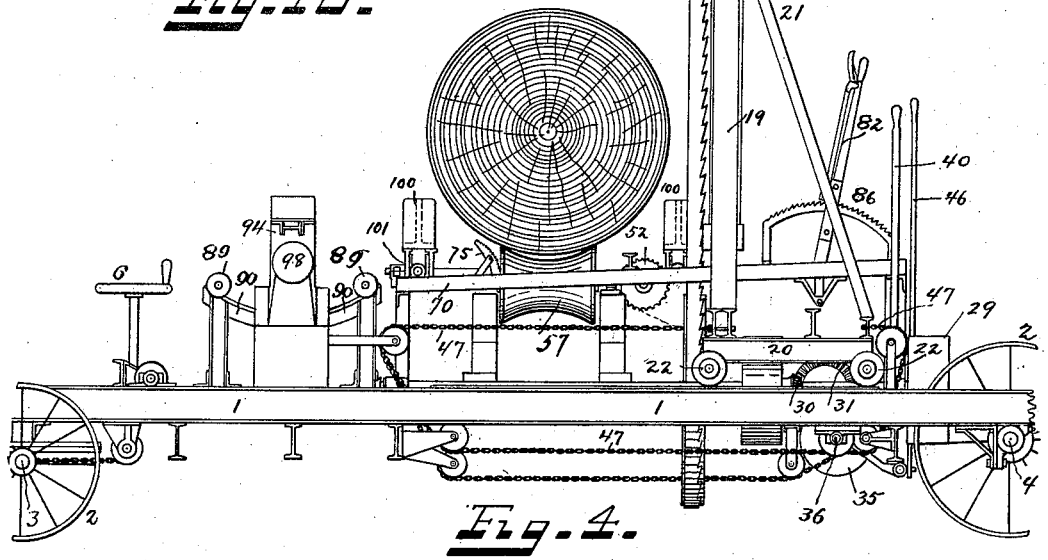
Witnesses.
J. B. Johnson
C. R. Gray.
Inventor.
Archibald P. Howard
by Prindle and Williamson
Attorneys.
COLUMBIA PLANOGRAPH CO., WASHINGTON, D. C.

A. P. HOWARD.
WOOD SAWING AND SPLITTING MACHINE.
APPLICATION FILED FEB. 17, 1908.
1,001,272.
Patented Aug. 22, 1911.
5 SHEETS—SHEET 5.
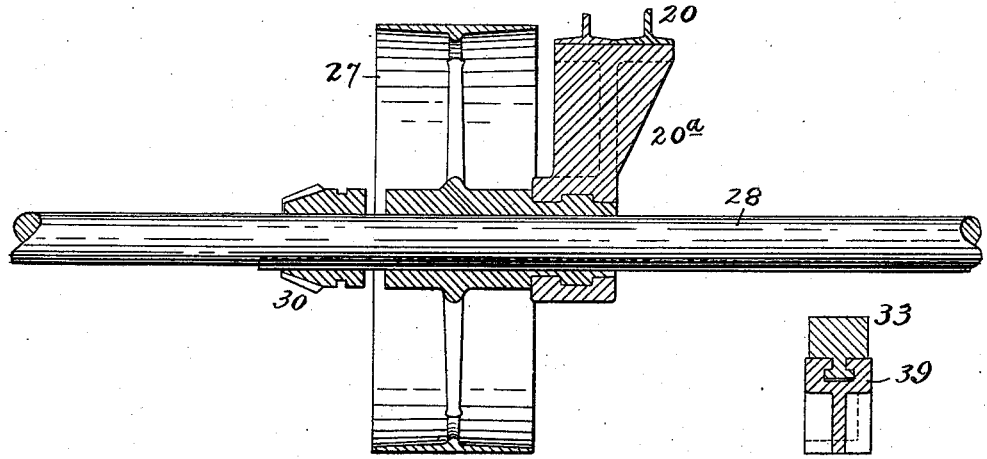
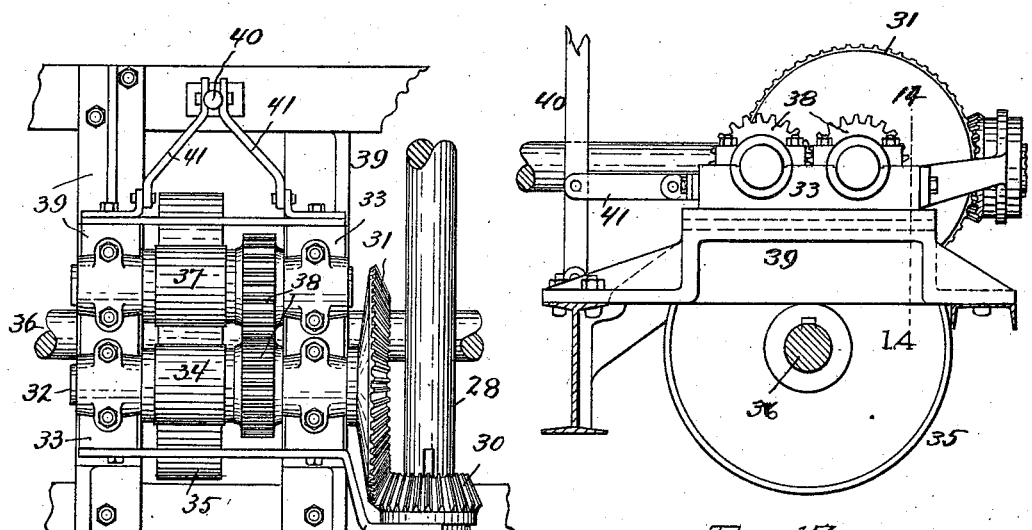

UNITED STATES PATENT OFFICE.

ARCHIBALD P. HOWARD, OF WELCHES, OREGON.

WOOD SAWING AND SPLITTING MACHINE.

1,001,272.  Specification of Letters Patent.  Patented Aug. 22, 1911.

Application filed February 17, 1908. Serial No. 416,329.

*To all whom it may concern:*

Be it known that I, ARCHIBALD P. HOWARD, of Welches, in the county of Clackimas and in the State of Oregon, have invented a certain new and useful Improvement in Wood Sawing and Splitting Machines, and do hereby declare that the following is a full, clear, and exact description thereof, reference being had to the accompanying drawings, in which—

Figure 1 is a plan view of a wood sawing and splitting machine embodying my invention; Fig. 2 a front elevation thereof; Fig. 3 a rear elevation; Fig. 4 a side elevation of said machine; Fig. 5 a detail view partly in section and partly in elevation of the wedge or splitting device; Fig. 6 a top plan view of the same; Fig. 7 a detail view in side elevation of the head blocks; Fig. 8 a detail view of the head blocks in end elevation; Fig. 9 a detail view partly in section and partly in elevation of the log-supporting means; Fig. 10 a detail view in end elevation thereof; Fig. 11 a detail section on the line 11—11 of Fig. 1; Fig. 12 a detail top plan view of the gearing for supporting the saw table; Fig. 13 a detail view of the same in elevation, with parts in section; and Fig. 14 a detail view in section on the line 14—14 of Fig. 13.

The object of my invention is to provide a machine, and especially a portable machine, by which logs may be cut crosswise and split into cord wood, or to saw logs into lumber, whereby these operations, and such manipulations of the logs as may be necessary to enable them to be performed, are done by mechanical means and with a minimum of manual work, and to this end my invention consists in the machine constructed substantially as hereinafter specified and claimed.

In the embodiment of my invention illustrated in the accompanying drawings, a framework 1 is employed having an oblong form and made up of horizontally extending and suitably united timbers or beams, and as the machine shown is designed to be readily portable, the frame is mounted on wheels 2 arranged in pairs on front and rear axles 3 and 4, respectively, situated at opposite ends of the frame. The front axle, as is customary, is pivoted by means of a king bolt or pin 5, and preferably a steering gear is provided which comprises a steering wheel 6 on the upper end of a vertical shaft which by means of worm gearing, may revolve a horizontal shaft 7 having near each end a drum 8 from which a chain 9 runs to and is connected with the front axle.

The saw which I prefer to use is a band saw 10, which passes over a lower band wheel or pulley 11 and an upper band wheel or pulley 12, and the latter is journaled in bearings on a vertical movable lever 13 pivoted intermediate its ends to a bracket 14 and having suspended on the sides of itself opposite that having the bearings for the band wheel, a weight 15 by means of a rod 16 for the purpose of maintaining the saw in a taut condition. The bracket 14 is vertically movable, and for this purpose is provided with a vertical adjusting screw 17 by which it may be raised or lowered on the horizontal arm 18 of a post or standard 19, that rises from a saw-supporting frame or table 20 composed of suitable bars or beams. The post or standard 19 is braced by means of bars 21 which are secured at their lower end to the saw table 20, and at their upper ends to said post or standard. The saw table is a movable or traveling one, so that the operation of sawing off a log is performed by moving or traversing the saw, and the frame 20 is, therefore, mounted upon wheels or rollers 22 which ride upon the longitudinally extending beams of the machine frame 1, the upper surfaces of said beams being provided preferably with metal straps to form tracks for the saw table wheel or rollers.

The shaft 23 of the lower band saw wheel or pulley, is journaled in a bearing mounted on the frame 20 of the saw carriage or table, and upon said shaft is keyed a pulley 24, from which a belt 25, whose upper horizontal lap passes beneath an idler pulley 26, runs to a pulley 27 keyed to a shaft 28 that extends longitudinally of the machine, and is journaled in boxes or bearings on two of the cross beams of the frame 1. At its rear end, said shaft 28 is provided with a belt wheel or pulley 29, by which power may be taken from some suitable engine to revolve the shaft 28. The pulley 27 is slidably mounted upon the shaft 28, to enable it to partake of the movements of the saw table, and to cause it to partake of such movements, it has its hub extended and engaged by a bracket 20ª which depends from the under side of the frame 20, the hub having an annular enlargement which engages an annular recess in the bracket to couple the pulley to the bracket so that the pulley will be moved by the bracket when the latter moves with the frame 20. The bracket 20ª assists in supporting the pulley. Power is also taken from the shaft 28 to move other portions of my machine, and for this purpose, said shaft 28 has keyed or splined to it a bevel pinion 30 which meshes with a bevel gear wheel 31 on a short transversely extending shaft 32 mounted in bearings upon two parallel blocks 33, and between said blocks said shaft carries a friction roller 34, adapted to engage the periphery of and to transmit motion to a friction wheel 35, on a shaft 36, extending crosswise of the machine frame 1. Since it is desirable to drive the shaft 36 in opposite directions at different times, I provide a second friction roller 37 which is mounted upon a shaft journaled in bearings on the blocks 33, which alternately with the friction roller 34, is adapted to engage the periphery of the friction wheel 35, and for revolving the friction roller 37, and in an opposite direction from the direction of revolution of the friction roller 34, I gear the said two rollers together by means of intermeshing spur gears 38. As will best be seen by reference to Figs. 12, 13 and 14, the blocks 33 are slidably mounted on parallel bars 39, the connection between the blocks and the bars 39 being, as best shown in Fig. 14, a rib and groove, and for the convenient sliding of the blocks, to place one friction roller or the other in contact with the friction wheel, I provide a lever 40, which is connected by links 41 to said blocks. In order to maintain the bevel pinion 30 on the shaft 23 in proper mesh with the bevel gear 31 for revolving the friction rollers, said bevel pinion 30 is slidably mounted on the shaft 23, and is caused to move with the blocks by an arm 42 which is bolted to the blocks and has a forked end which engages an annular groove in the hub of the pinion. Loose on the transversely extending shaft 36 are two drums or spools 43, each having a clutch face adapted by means of an ordinary clutch collar 44, to be clutched to the shaft 36, and the two clutch collars may be moved simultaneously by means of a transversely extending rod 45 from which an arm extends to each clutch collar, and for reciprocating said rod 45, a hand lever 46 is provided, pivoted to one of the cross beams of the frame 1. A cable or chain 47, after being passed several turns around each drum, is carried thence in opposite directions shown best in Fig. 4 over pulleys or sheaves and its ends secured to the saw table 20 at opposite sides thereof, so that by the revolution of the drums, the saw table through the chain connections therewith, may be caused to move back and forth from front to rear of the machine according to the direction of revolution of the shaft 36. Also loose on the shaft 36 is a sprocket wheel 48, which may be clutched to and unclutched from the shaft by means of a clutch collar 49 that by an arm 50 is also connected to the longitudinally movable rod 45, so that simultaneously said clutch and the chain drum clutches may be moved by actuating the hand lever 46, but said clutches are so arranged that when the sprocket wheel is clutched to the shaft, the chain drum will be unclutched therefrom, and vice versa. From the sprocket wheel 48, a chain 51 runs to a sprocket wheel 52 mounted on a shaft 53 that extends crosswise of the direction of travel of the saw table and has journaled in brackets 54 secured to a framework 55, consisting of timbers or beams supported by legs 56 which rest on the ground, such framework being preferably not connected to the frame 1, because it is desirable to have such framework 55, and the parts carried thereby, readily removable from the machine. Extending crosswise of the frame 55, are several, as shown three, rollers, 57, 58 and 59, with concave peripheries adapted to receive and support logs to be cut, and the two end rollers are driven rollers for feeding the log lengthwise, and to drive them, the roller 57, which is nearest the frame 1, and the path of the saw, has a bevel wheel 60, which meshes with and receives motion from a bevel wheel 61 on the shaft 53. The roller 59 likewise has a bevel wheel 62 which meshes with a bevel wheel 63, that is loose on the shaft 53, and is adapted to be clutched to and unclutched therefrom by means of a clutch collar 64 for which a shifting lever 65 is provided, so that at will the roller 59 may be revolved or not. Besides the rollers 57, 58 and 59, for supporting the logs, a car 66, having wheels which roll upon the beams of the framework 55, is provided. To move or haul a log up on the rollers and car, any number of drums, like the drum 67, may be mounted upon the shaft 53, from which a chain 68 having one end fastened to the framework 55, may pass around the log, as illustrated in Fig. 1. Inclined skids or guides 69, are provided, over which the log is hauled or pulled on to the feeding and supporting rollers and car.

The end of the log to be cut off, must, of course, be supported against the thrust of the saw while cutting, and I make the following provision for this purpose. Supported by posts 70, on the frame 1, are two parallel beams or bars 71 that extend parallel with the direction of travel of the saw table or carriage, and inclined slightly from their rear ends forward and downward, and at about their mid-length, they are tied together or braced by a cross bar 72, and about midway between said bars 71, are two similar parallel bars 73, which are preferably of channel iron, and, as shown best in Fig. 10, have their grooved or channeled sides toward each other. Situated so as to engage the side of the log to be cut, which is toward the rear of the machine, are two wedge shaped blocks 74 that, respectively, are mounted upon the two bars 71. Adapted to engage the side of the log toward the front of the machine, is a dog 75 which has a toothed or serrated log-engaging face, and is segment-shaped, and is pivoted at one end to a pin 76 mounted in a block 77, that is mounted between the two channel bars 73. To the dog intermediate its ends, a pair of links 78 are pivotally connected at one end, and at their other end are pivotally connected to a longitudinally movable rod 79 which passes through and is guided by an opening in the block 77, and at each end said rod is supported by antifriction rollers 80 which rest and roll upon the bottom flanges of the channel bars. By the longitudinal movement of the rod 79, the dog may be swung up into engagement with a log, or down into the space between the two channel bars below the upper side thereof, so as to be out of the path of the cut off portion of the log in moving downward along the inclined bars 73, and to limit the movement of the rod when it moves the dog to its lowered position, the rod has on it a collar or shoulder 81 adapted to strike the block 77. For moving the rod longitudinally to actuate the dog, a hand lever 82 is provided, having a pin or projection 83 adapted to engage in one of a series of notches 84 in the under side of a bar 85 that is pivotally connected to the rod 79. A plurality of pin-engaging notches is provided, in order to enable the degree of movement of the log-engaging dog to be varied to suit logs of different diameters. An ordinary toothed segment 86 and latch to coöperate therewith, are provided to lock the dog-operating lever 82.

Besides its swinging movement, the dog 75 has a sliding movement with the block 77 to move the dog bodily toward and from the log to be engaged. The movement of the block 77 away from the log is produced by the engagement of the collar 81 on the rod 79, while its movement in the opposite direction, or toward the log, is produced by the connections between the rod and block, consisting of the links 78 and the dog. Mounted on the shaft or pin 76, which pivotally connects the dog to the block 77, is an arm or lever 87, which extends substantially parallel with the dog, and is pressed yieldingly in the direction of contact with the log by means of a spring 88. The arm or lever 87 encountering the log, arrests movement of the block 77, so that the continued movement of the rod 79 operates to tightly engage the dog with the log. The lever or arm 87 being yieldingly supported in log-engaging position by the spring, it will, of course, when the log rolls down the inclined bars 73, yield before the log.

From the inclined bars 73, the cut off piece of log is delivered to the splitting mechanism, passing from the bars 73 into a cradle-form support, consisting of several parallel rollers 89 supported in a curvilinear series by a frame consisting of concavo-convex bars 90 with their concave sides upward, and posts or uprights 91 which support said curved bars from the machine frame 1. At one end of the cradle, there is a post or upright 92 that forms an anvil to support the block to be split at one end, and at the other end of the cradle is a post or upright 93, which supports a horizontal guideway 94 for a horizontally reciprocable ax 95. The butt end of the ax, which is preferably faced with wood or other appropriate material, is adapted to be engaged by a hammer 96 carried on the end of a piston rod 97 of the piston of a cylinder 98, for steam, air, or other fluid under pressure. The forward or splitting movement of the ax is limited by ears or projections 99 on its side that engages the guide.

When it is desired to saw the log lengthwise into planks or lumber, I employ a pair of head blocks 100, that are in line with each other, and on a line parallel with the direction of travel of the saw, and which are slidably mounted in guides 101, in which they may be moved back and forth by a feed screw for each head block, which may be conveniently revolved by means of a bevel pinion 102 on one end, which meshes with a pinion 103 on a shaft 104 having a crank 105, by which the shaft 104 may be revolved to simultaneously rotate both feed screws to move the two head blocks alike. The log-engaging knee of the head block may be swung from a vertical to a horizontal position to get it out of the way of a log to be placed in position for cutting, and to permit this, the head block is recessed or slotted on one side.

The operation of the machine illustrated, is as follows: The machine having been drawn or hauled to the place where it is to be used, is securely blocked upon the ground, and the rear carrying wheel near the pulley 29, is removed for the more convenient application of the driving belt to avoid interference with it. If the saw table is not already in the position where the saw is situated as shown in dotted lines in Fig. 1, the two chain drums 43 are clutched to their shaft 36, to cause the travel of the saw table from the position shown in full lines in Fig. 1, to the position where the saw is shown in dotted lines in said figure, and then said drums are unclutched from their shaft 36 and simultaneously the sprocket wheel 48 is clutched to the shaft 36 to revolve the shaft 53, and thereby the drum or drums 67 to draw or haul the log to be cut, upon the carrying and feeding rollers and the car. The log being placed upon its supporting and feeding devices, the revolution of the drums 67 is stopped, and the ends of their chains are released, and if desired, the revolution of the drums 67 may be reversed to unwind them from the drums, by changing the engagement of the friction rollers 34 and 37 with their friction wheel, by proper movement of the shifting lever 40. The clutch lever 65 is now operated to clutch the bevel wheel 63 to the shaft 53 to impart motion to the roller 59, which roller is the only one of this series on which the log rests, and the sprocket wheel 48 which is now clutched to the shaft 36, will revolve the shaft 53, and thereby revolve both rollers 57 and 59, and so feed the log longitudinally the required distance to place the portion to be cut off in the path of the saw. The clutch-operating rod 45 is now moved by the lever 46 to unclutch the sprocket wheel from the shaft 36 and to clutch the two drums 43 to said shaft, both friction rollers 34 are moved by means of the lever 40 to render both inactive to rotate the shaft 36, to give time for applying the devices for supporting the end of the log to be cut off. The lever 82 for operating the log-engaging dog 75, is now operated to move the dog into engagement with the log at one side, the log on the opposite side engaging the wedges 74, and the log being thus firmly supported, the lever 40 is operated to engage the appropriate friction roller and the friction wheel 35 to revolve the shaft 36 in the direction necessary to move the saw carriage from the position where the saw is shown in dotted lines in Fig. 1 to the position where it is shown in full lines in Fig. 1 to cross cut the log, the portion cut off of course lying between the two vertical laps of the band saw. The piece of log having been cut off, the dog-operating lever 82 is released and moved to place the dog out of the path of the cut off portion of the log, and the latter then rolls down the inclined bars 73, and passes into the cradle by which it is supported for splitting. The power hammer is now operated to drive or force the ax into the log to split it, and this operation is repeated as many times as may be desired, the log being turned over in the cradle by hooks for successive splitting operations.

When a log is to be sawed lengthwise, or into slabs or planks, in which case the head blocks are used, I remove the framework 55, and the parts carried thereby, from position, so that they will not interfere with the operation.

Having thus described my invention, what I claim is—

In a sawing machine the combination of a traveling table for the sawing mechanism, a shaft having drums, flexible connections extending from the drums to said table and connected therewith to act oppositely thereon, whereby on revolving the drum shaft in opposite directions, movement of the table in opposite directions takes place, a power shaft, gearing between the power shaft and the drum shaft comprising oppositely driven rollers, and a wheel, and means to change the engagement of rollers and wheel to reverse the direction of revolution of the drum shaft.

In testimony that I claim the foregoing I have hereunto set my hand.

ARCHIBALD P. HOWARD.

Witnesses:
   TRUMAN J. GLOVER,
   LESTER L. CURL.